US010614223B2

(12) United States Patent
Abramovsky et al.

(10) Patent No.: US 10,614,223 B2
(45) Date of Patent: Apr. 7, 2020

(54) SECURITY VULNERABILITY DETECTION

(71) Applicant: ENTIT Software LLC, Sunnyvale, CA (US)

(72) Inventors: Ori Abramovsky, Yehud (IL); Ori Weingart, Yehud (IL); Maor Yosef, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 157 days.

(21) Appl. No.: 15/574,628

(22) PCT Filed: May 28, 2015

(86) PCT No.: PCT/US2015/032986
§ 371 (c)(1),
(2) Date: Nov. 16, 2017

(87) PCT Pub. No.: WO2016/190883
PCT Pub. Date: Dec. 1, 2016

(65) Prior Publication Data
US 2018/0150639 A1 May 31, 2018

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 21/57* (2013.01); *G06F 2221/033* (2013.01)

(58) Field of Classification Search
CPC ... G06F 21/577; G06F 2221/033; G06F 21/57
(Continued)

(56) References Cited

U.S. PATENT DOCUMENTS 8,020,210 B2 * 9/2011 Tippett ................ H04L 63/1416
726/23
8,677,497 B2 * 3/2014 Basavapatna ......... G06F 21/577
726/25
(Continued)

FOREIGN PATENT DOCUMENTS

EP     1622062 A2     2/2006

OTHER PUBLICATIONS

Bhoraskar, R. et al., "Brahmastra: Driving Apps to Test the Security of Third-party Components," (Research Paper), Jun. 1, 2014, 16 pages.
(Continued)

*Primary Examiner* — Lynn D Feild
*Assistant Examiner* — Viral S Lakhia

(57) ABSTRACT

In one example in accordance with tie present disclosure, a method for security vulnerability detection includes indexing a variety of internet sources comprising third party submitted information, to extract security vulnerabilities based on the third party submitted information. The method includes generating a security vulnerabilities list comprising security vulnerabilities from the internet source and generating a software components list comprising a software component used in an application. The method includes determining that a security vulnerability in the security vulnerabilities list affects the software component and determining a risk score of the security vulnerability. The method includes presenting the security vulnerability, the risk score and the software component via a user interface.

19 Claims, 6 Drawing Sheets

(58) Field of Classification Search
USPC .......................................................... 713/170
See application file for complete search history.

(56) References Cited

U.S. PATENT DOCUMENTS

| | | | | |
|---|---|---|---|---|
| 9,323,935 | B2* | 4/2016 | Condry | G06F 21/568 |
| 9,537,876 | B2* | 1/2017 | Kelekar | H04L 63/1408 |
| 9,697,352 | B1* | 7/2017 | Armstrong | G06F 21/50 |
| 10,037,689 | B2* | 7/2018 | Taylor | G08G 1/0141 |
| 2004/0230835 | A1 | 11/2004 | Goldfeder et al. | |
| 2005/0198527 | A1 | 9/2005 | Johnson et al. | |
| 2009/0288141 | A1* | 11/2009 | Khachaturov | G06F 21/577 726/3 |
| 2012/0042383 | A1* | 2/2012 | Greene | G06F 21/57 726/25 |
| 2012/0047581 | A1* | 2/2012 | Banerjee | G06F 21/554 726/24 |
| 2012/0210434 | A1* | 8/2012 | Curtis | G06F 21/577 726/25 |
| 2012/0222122 | A1* | 8/2012 | Das | G06F 21/577 726/25 |
| 2012/0272205 | A1* | 10/2012 | Fox | G06F 8/36 717/101 |
| 2012/0324582 | A1* | 12/2012 | Park | G06F 21/577 726/25 |
| 2013/0097706 | A1 | 4/2013 | Titonis et al. | |
| 2013/0191918 | A1* | 7/2013 | Nachenberg | G06F 21/56 726/24 |
| 2014/0047513 | A1* | 2/2014 | van 't Noordende | G06F 21/44 726/4 |
| 2014/0137190 | A1* | 5/2014 | Carey | H04L 63/1433 726/3 |
| 2014/0245253 | A1* | 8/2014 | Goldfeder | G06F 8/00 717/100 |
| 2016/0127402 | A1* | 5/2016 | Veeramachaneni | H04L 63/1425 726/23 |

OTHER PUBLICATIONS

Cadariu, M., "Tracking Known Security Vulnerabilities in Third-party Components," (Research Paper), Aug. 27, 2014, 86 pages.

Palamida, "Palamida Enterprise Edition 6," Datasheet, 2012, 4 pages, available at http://www.palamida.com/themes/resources/Palamida_DataSheet_EnterpriseEdition6.pdf.

Sonatype, "Risk Assessments—Overview," (Web Page), retrieved online May 28, 2015 at http://www.sonatype.com/assessments/overview.

International Searching Authority., International Search Report and Written Opiniori dated Mar. 31, 2018 for PCT Application No. PCT/US2015/032986 filed May 28, 2015, 12 pages.

* cited by examiner

SECURITY VULNERABILITY DETECTION

BACKGROUND

Modern applications may include numerous software components including software components that were developed by a party other than an original software vendor of a development platform. Example software components may include frameworks, libraries, packages, drivers and client components. A security vulnerability in any software component may put an entire application that uses, either directly or indirectly, the software component at risk.

BRIEF DESCRIPTION OF THE DRAWINGS

The following detailed description references the drawings, wherein.

DETAILED DESCRIPTION

Figure 1:
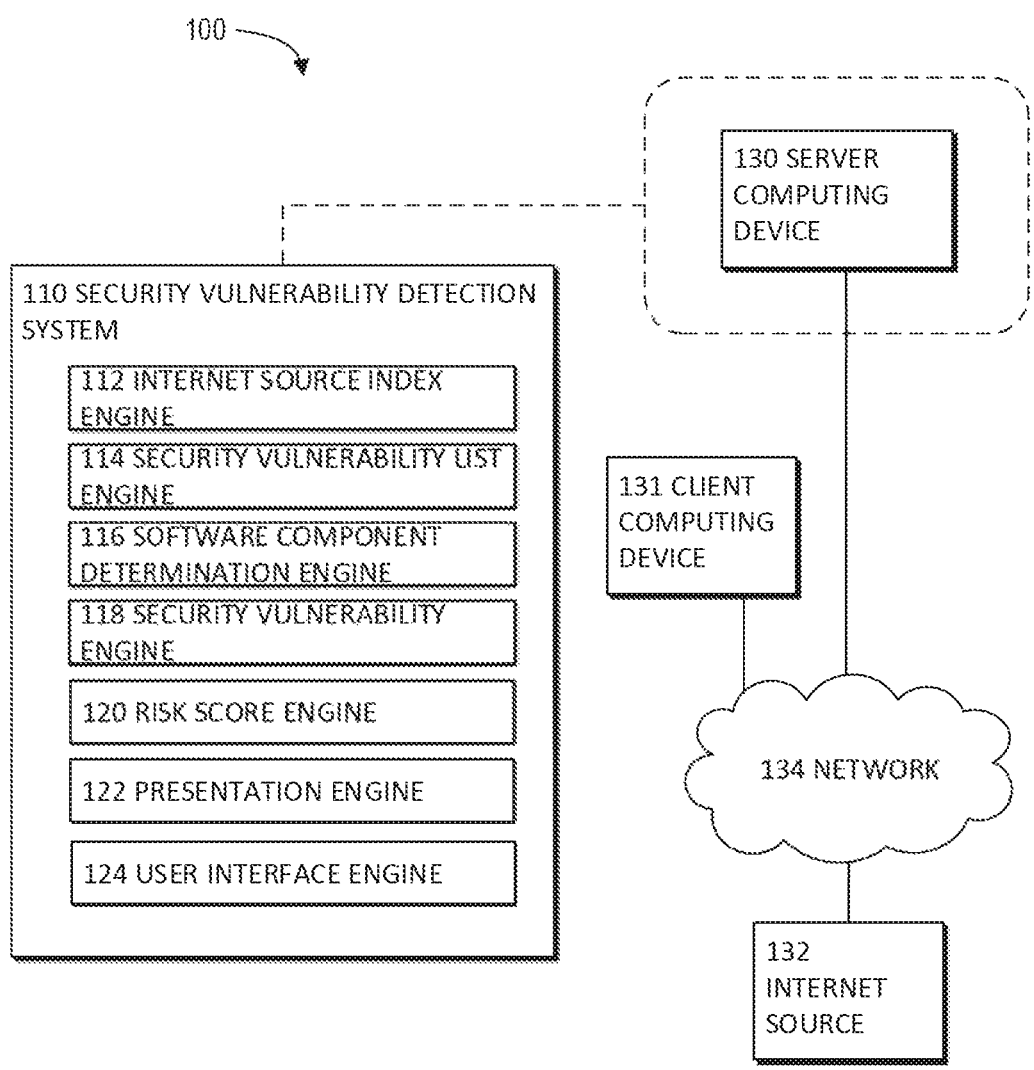
FIG. 1 is a block diagram of an example computing environment in which security vulnerability detection may be useful.

Tracking all of the software components used in application and security vulnerabilities for the software components may be challenging because modern applications use numerous software components that may be constantly added, removed or upgraded over a short period of time. Moreover, security vulnerabilities may not be detected until well after a software component is released. Accordingly, by the time an application developer becomes aware of a security vulnerability in a software component used in an application, the application may already be compromised. In many cases, however, the security vulnerability may be first discussed online before a formal announcement is released by the vendor who developed the software component.

Example security vulnerability detection systems address these issues by indexing an internet source comprising third party submitted information regarding security vulnerabilities. "Third party," may refer to a party other than an original software vendor of a development platform. The internet source may be a web site where individual users can submit information, a forum, a blog, a news site, a social network and/or a community internet source comprising information that originates from a community member. The internet source may also include structured and/or unstructured information. In this way, the security vulnerability detection system creates a security vulnerabilities list based on crowd wisdom or crowd sourced information.

Example security vulnerability detection systems may track some or all of the software components used in the application in real time or near real time and present recently discovered security vulnerabilities. Moreover, by constantly indexing a variety of internet sources, the security vulnerabilities list remains up to date as it includes information from blogs, communities and news websites that are often the first to report and/or discover security vulnerabilities.

Example security vulnerability detection systems may include indexing an internet source, generating a security vulnerabilities list, generating a software components lists, determining that a security vulnerability in the security vulnerabilities list affects a software component, determining a risk score of the security vulnerability and presenting the security vulnerability and the software component.

Generating the security vulnerabilities list may include scanning and indexing a variety of internet sources. The internet sources may provide data and information on software security vulnerabilities. Example security vulnerabilities may include blogs, communities and news websites. The index may be updated on a scheduled basis (hourly, daily, weekly, etc.) to capture the latest information on security vulnerabilities.

Generating a software components list may include scanning an application to build a list of all the software components used by the application. The application scan may also include scanning the application, including the resources of the application and/or the source code of the application. The current version of each software component used by the application may also be saved and included in the software components list. The scan may be triggered each time the application and/or source code is updated to accurately reflect the software components used by the application.

Once the security vulnerabilities list and the software components list have been generated, each software component in the software components list may be matched against the security vulnerabilities list. Each software component may also be scored based on a number of security vulnerabilities found for the software component and if a fix was provided for the security vulnerabilities. The version of the software component may also be used to match the software components in the security vulnerabilities list. The score may also be based on a severity of the security vulnerability.

The security vulnerability and affected software component may be presented to a user and the user may be further notified each time a new software component affected by a security vulnerability is added to the application and/or when a security vulnerability is discovered for a software component used in the application.

FIG. 1 is an example environment 100 in which various examples may be implemented as a security vulnerability detection system 110. Environment 100 may include various components including a server computing device 130, a client computing device 131 and an internet source 132. The client computing device 131 may communicate requests to and/or receive responses from the server computing device 130. The server computing device 130 may communicate requests to and/or receive responses from the internet source 132.

The internet source 132 may include third party submitted information regarding security vulnerabilities. "Third party," may refer to a party other than an original software vendor of a development platform. For example, a third party may include one who provides content to the internet source, such as a news reporter, blogger, etc. The third party may also refer to a user of the internet source, such as a community user, commenter, forum poster, etc. The internet source may include structured and unstructured data sources, a web site where individual users can submit information, a forum, a blog, a news site, a social network, a software vulnerabilities web site, a developer blog, a security blog, a developer community, a security community, a technology news web site, a community internet source comprising information that originates from a community member, etc. The internet source 132 may be any source which contains data and references regarding security vulnerabilities. The internet 132 source may include structured and unstructured data. While the internet source 132 is depicted as a single source, the internet source 132 may include any number of internet sources as described above.

The server computing device 130 may receive and/or respond to requests from the client computing device 131. The client computing device 131 may be any type of computing device providing a user interface through which a user can interact with a software application. For example, the client computing device 131 may include a laptop computing device, a desktop computing device, an all-in-one computing device, a tablet computing device, a mobile phone, and/or other electronic device suitable for displaying a user interface and processing user interactions with the displayed interface. While the server computing device 130 is depicted as a single computing device, the server computing device 130 may include any number of integrated or distributed computing devices serving at least one software application for consumption by the client computing device 131.

The various components (e.g., components 130, 131, and/or 132) depicted in FIG. 1 may be coupled to at least one other component via a network 134. Network 134 may comprise any infrastructure or combination of infrastructures that enable electronic communication between the components. For example, the network 134 may include at least one of the internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, security vulnerability detection system 110 and the various components described herein may be implemented in hardware and/or a combination of hardware and programming that configures hardware. Furthermore, in FIG. 1 and other figures described herein, different numbers of components or entities than depicted may be used.

Security vulnerability detection system 110 may comprise various components, including an internet source index engine 112, a security vulnerability list engine 114, a software component determination engine 116, a security vulnerability engine 118, a risk score engine 120, a presentation engine 122, a user interface engine 124, and/or other components. The components of the security vulnerability detection system 110 as described herein, may refer to a hardware or a combination of hardware and instructions that performs a designated function. As is illustrated with respect to FIG. 6, the hardware of the various components of security vulnerability detection system 110, for example, may include one or both of a processor and a machine-readable storage medium, while the instructions are code stored on the machine-readable storage medium and executable by the processor to perform the designated function.

Internet source index engine 112 may index an internet source comprising third party submitted information regarding security vulnerabilities. Internet source index engine 112 may scan the content of the internet source and extract information about the security vulnerabilities. The extracted information may be based on the third party submitted information.

As described herein, "third party" may refer to a party other than an original software vendor of a development platform, internet source index engine 112 may also index a web site where individual users of the web site can submit information, a blog, a news site and/or a social network. Internet source index engine 112 may also index a community internet source comprising information that originates from a community member. As used herein, a "community member" may be a user of an Internet source who also provides information to the internet source through the use of comments, blog posts, fact checking, proof reading, direct contact with an owner, employee, contractor and/or operator of the community web source, etc. Internet source index engine 112 may also index an unstructured data source comprising third party submitted information regarding security vulnerabilities.

Security vulnerability list engine 114 may generate a security vulnerabilities list comprising security vulnerabilities from the internet source. In other words, the security vulnerabilities list may include all security vulnerability information indexed from the internet source. The security vulnerabilities list may be updated on a scheduled basis (hourly, daily, weekly, etc.) in order to include timely information on the security vulnerabilities. The update may also be performed whenever the application, the application resources and/or source code application are changed. The update may also be performed manually, as selected by a user of the system.

Software component determination engine 116 may generate s software components list comprising a software component used in an application. Example software components may include plug-ins, frameworks, libraries, packages, drivers and client components. Software components may be developed by a party other than an original software vendor of a development platform. Software component determination engine 116 may generate the software components list by scanning the application to build a list of software components used in the application. Software component determination engine 116 may also generate the software components list without evaluating the source code of the application. Software component determination engine 116 may scan the actual source code of the application and/or the resources of an application, such as Hypertext Markup Language (HTML) files, Project Object Model (POM) files, etc.

Software component determination engine 116 may also generate a software components list comprising a software component used in an application and a version of the software component. Software component determination engine 116 may generate the software components list each time the application and/or source code is updated to keep the software components list accurate.

Security vulnerability engine 118 may determine that a security vulnerability in the security vulnerabilities list affects the version of the software component from the software components list. Once the security vulnerabilities list and the software components list have been generated, security vulnerability engine 118 may cross reference the security vulnerabilities list and the software components list to determine if any of the security vulnerabilities in the security vulnerabilities list affect any of the software components in the software components list. Security vulnerability engine 118 may further determine the number of security vulnerabilities found for each software component in the software components list and/or the severity of each security vulnerability. The severity may be represented by a numerical score, a color, a description, etc. Security vulnerability engine 118 may also determine whether a fix has been provided and/or discovered for the security vulnerability. For example, the developer of a software component may provide a fix for the security vulnerability, a fix for the security vulnerability may be provided by another party and/or a fix for the security vulnerability may be discovered. Security vulnerability engine 118 may also determine that a security vulnerability in the security vulnerabilities list affects the version of the software component from the software components list.

Risk score engine 120 may determine a risk score of the security vulnerability for each software component that is affected by a security vulnerability in the security vulnerabilities list. The risk score for each software component may be based on the number of security vulnerabilities found for the component, the severity of the security vulnerability, whether a fix has been provided and/or discovered for the security vulnerability.

Risk score engine 120 may also determine whether to present the software vulnerability. For example, risk score engine 120 may use a threshold risk score to determine whether or not to present the software vulnerability. If the risk score determined for the security vulnerability is below the threshold risk score, risk score engine 120 may determine that the security vulnerability will not be presented. If the risk score determined for the security vulnerability is above the threshold risk score, risk score engine 120 may determine that the security vulnerability will not be presented. Risk score engine 120 may use a default threshold, the threshold may be set and/or adjusted by a user of the system, etc.

Presentation engine 122 may present, via a user interface, the security vulnerability and the software component. The security vulnerability, once determined may be presented, via the user interface (e.g., of a security platform), to a user (e.g., of the security platform). Any information related to the security vulnerability may also be presented. By default, presentation engine 122 may present certain predefined information via the user interface. The default information may be changed, however, by a setting, such that only desired information is presented by presentation engine 122. As such, the user may access the security vulnerability and/or the information related to the security vulnerability via the user interface. Examples of the information related to the security vulnerability may include but not be limited to a risk score associated with the security vulnerability (e.g., as discussed herein with respect to risk score engine 120), the software component affected by the security vulnerability (e.g., as discussed herein with respect to software component determination engine 116 and security vulnerability engine 118), the version of the software component, information related to the number of security vulnerabilities found for the security vulnerability, the severity of the security vulnerability found for the software component, whether a fix for the security vulnerability has been found and/or discovered and the source of the fix for the security vulnerability.

User interface engine 124 may generate the user interface used by the presentation engine 122 to present the security vulnerability and the software component.

Figure 2:
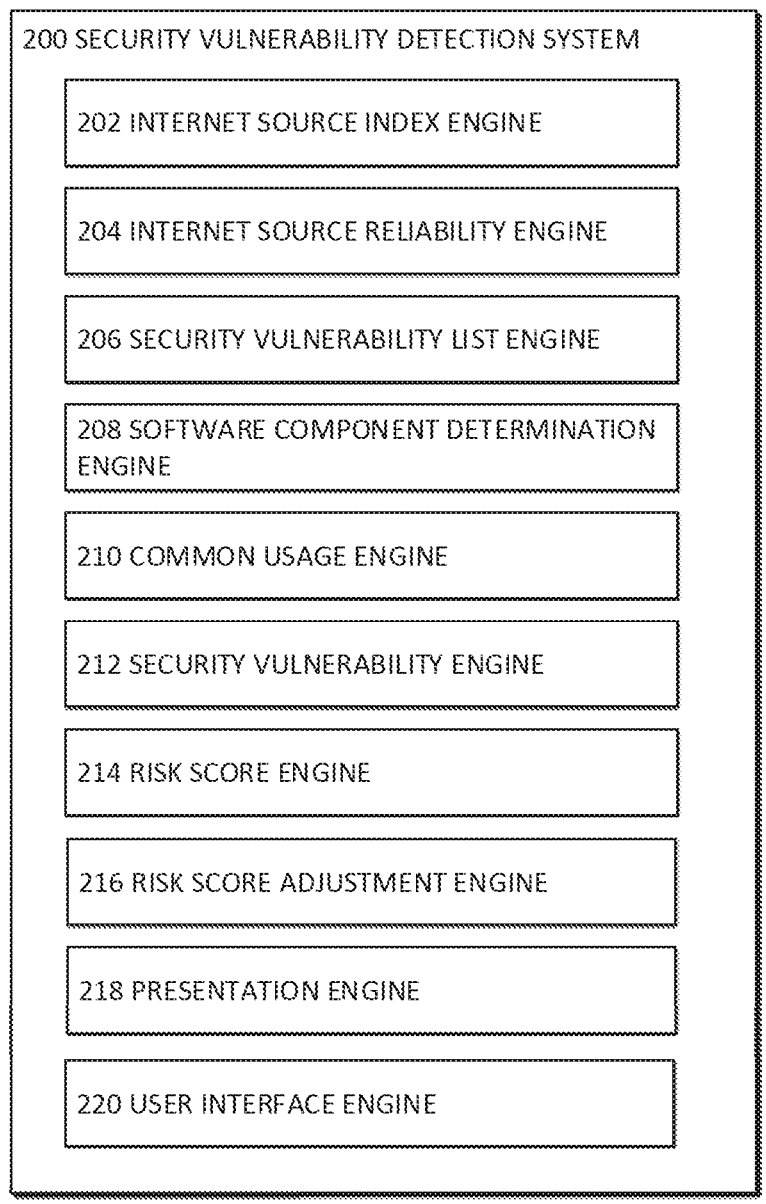
FIG. 2 is a flowchart of an example method for security vulnerability detection.

FIG. 2 is a block diagram depicting an example security vulnerability detection system 200. Security vulnerability detection system 200 may comprise various components, including an internet source index engine 202, an internet source reliability engine 204, a security vulnerability list engine 206, a software component determination engine 208, a common usage engine 210, a security vulnerability engine 212, a risk score engine 214, a risk score adjustment engine 218, a presentation engine 218, a user interface engine 220, and/or other components. The components of the security vulnerability detection system 200 as described herein, may refer to a hardware or a combination of hardware and instructions that performs a designated function. As is illustrated with respect to FIG. 6, the hardware of the various components of security vulnerability detection system 200, for example, may include one or both of a processor and a machine-readable storage medium, while the instructions are code stored on the machine-readable storage medium and executable by the processor to perform the designated function.

Engines 202, 206, 208, 212, 214, 218 and 220 may be similar to engines 112-124 respectively. Internet source reliability engine 204 may determine a reliability metric for an internet source based on an accuracy of information provided by the internet source. For example, information provided by an internet source may not always be accurate. This is especially so because the information may be provided by a party other than an original software vendor of a development platform, i.e., a third party. Internet source reliability engine 204 may also analyze information provided on the internet source to determine the accuracy. For example, internet source reliability engine 204 may analyze comments, forum posts, etc. internet source reliability engine 204 may also determine the accuracy of information provided by the internet source based on information provided by the same internet source in the past. For example, a particular community forum may have provided accurate information in the past. As another example, a particular news source may have provided inaccurate and/or in incomplete information in previous reports.

Internet source reliability engine 204 may store information related to previous security vulnerabilities provided by the internet source and/or an indicator of an accuracy of the stored information, internet source reliability engine 204 may access the stored information and/or indicator in determining the reliability metric. Internet source reliability engine 204 may also assign a default reliability metric to an internet source. For example, the default reliability metric may indicate that a particular internet source is reliable, if there is no indication that the internet source is not reliable.

Common usage engine 210 may determine that the software component is a commonly used component. As used herein, a commonly used component is software component used in a large number of applications. Common usage engine 210 may determine that the software component is a commonly used component by analyzing information from the internet source such as statistics, analytics, comments, etc. Common usage engine 210 may also tally how many users of the security vulnerability detection system, such as the system 200, use the software component in their application.

Risk score adjustment engine 218 may adjust the risk score based on a variety of factors. For example, risk score adjustment engine 216 may adjust the risk score based on: a reliability metric (e.g., as discussed herein with respect to internet source reliability engine 204), a determination that the software component is a commonly used component (e.g., as discussed herein with respect to common usage engine 210), a number of security vulnerabilities found for the software component, whether a fix has been provided for each security vulnerability, a recentness of the internet source, a number of comments from the internet source and an amount of internet traffic to the internet source. An administrator and/or user of the system may select which factors are used in adjusting the risk score. Risk score adjustment engine 216 may weight certain factors more highly when adjusting the risk score.

Figure 3:
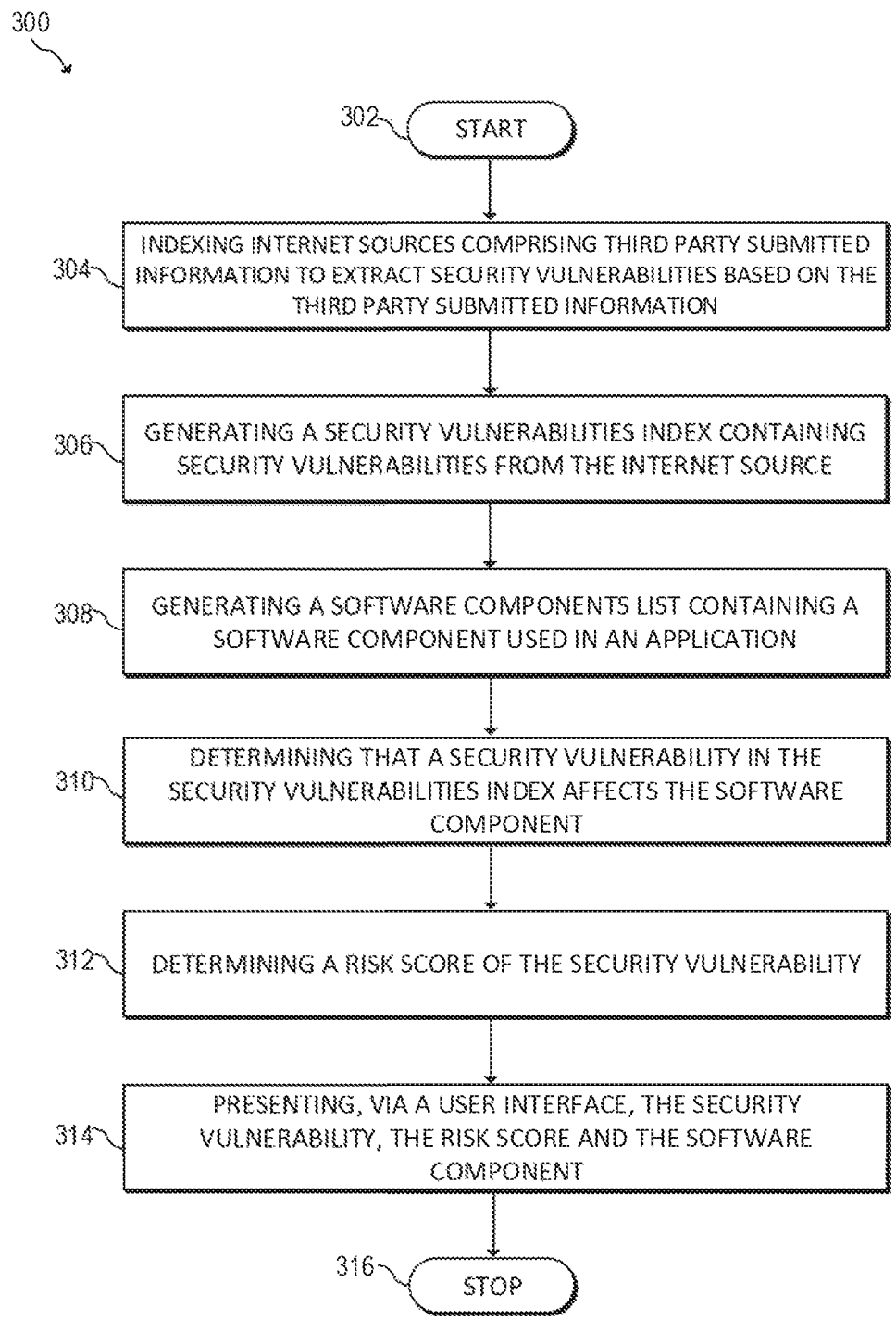
FIG. 3 is a flowchart of an example method for security vulnerability detection.

FIG. 3 is a flowchart of an example method 300 for a determining security vulnerabilities. Method 300 may be described below as being executed or performed by a system, for example, system 110 of FIG. 1, system 500 of FIG. 5 or system 800 of FIG. 8. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the method may include indexing a variety of internet sources comprising third party submitted information to extract security vulnerabilities based on the third party submitted information. The internet source may include third party submitted information regarding security vulnerabilities. "Third party," may refer to a party other than an original software vendor of a development platform. For example, a third party may include a poster to the internet source, such as a news reporter, blogger, etc. The third party may also refer to a user of the internet source, such as a community user, commenter, forum poster, etc. The internet source may include structured and unstructured data sources, a web site where individual users can submit information, a forum, a blog, a news site, a social network, software vulnerabilities web sites, developer blogs, security blogs, developer communities, security communities, technology news web sites, a community internet source comprising information that originates from a community member, etc. The internet source may be any source which contains data and references regarding security vulnerabilities. The internet source may include structured and unstructured data.

At step 306, the method may include generating a security vulnerabilities list comprising security vulnerabilities from the internet source. Generating the security vulnerabilities list may include indexing the internet source and/or structuring an unstructured data source for inclusion in the index. At step 308, the method may include generating a software components list comprising a software component used in an application. The software component may include plug-in software components and the application may include developer platforms. The method may also include generating a version of the software component. At step 310, the method may include determining that a security vulnerability in the security vulnerabilities list affects the software component. The method may also include determining that the security vulnerability affects the version of the software component. At step 312, the method may include determining a risk score of the security vulnerability. The risk score may be based on number of security vulnerabilities found for the software plug-in component and whether a fix has been provided for each security vulnerability. At step 314, the method may include presenting, via a user interface, the security vulnerability, the risk score and the software component. If applicable, the method may also include presenting the version of the software component. Method 300 may eventually continue to step 316, where method 300 may stop.

Figure 4:
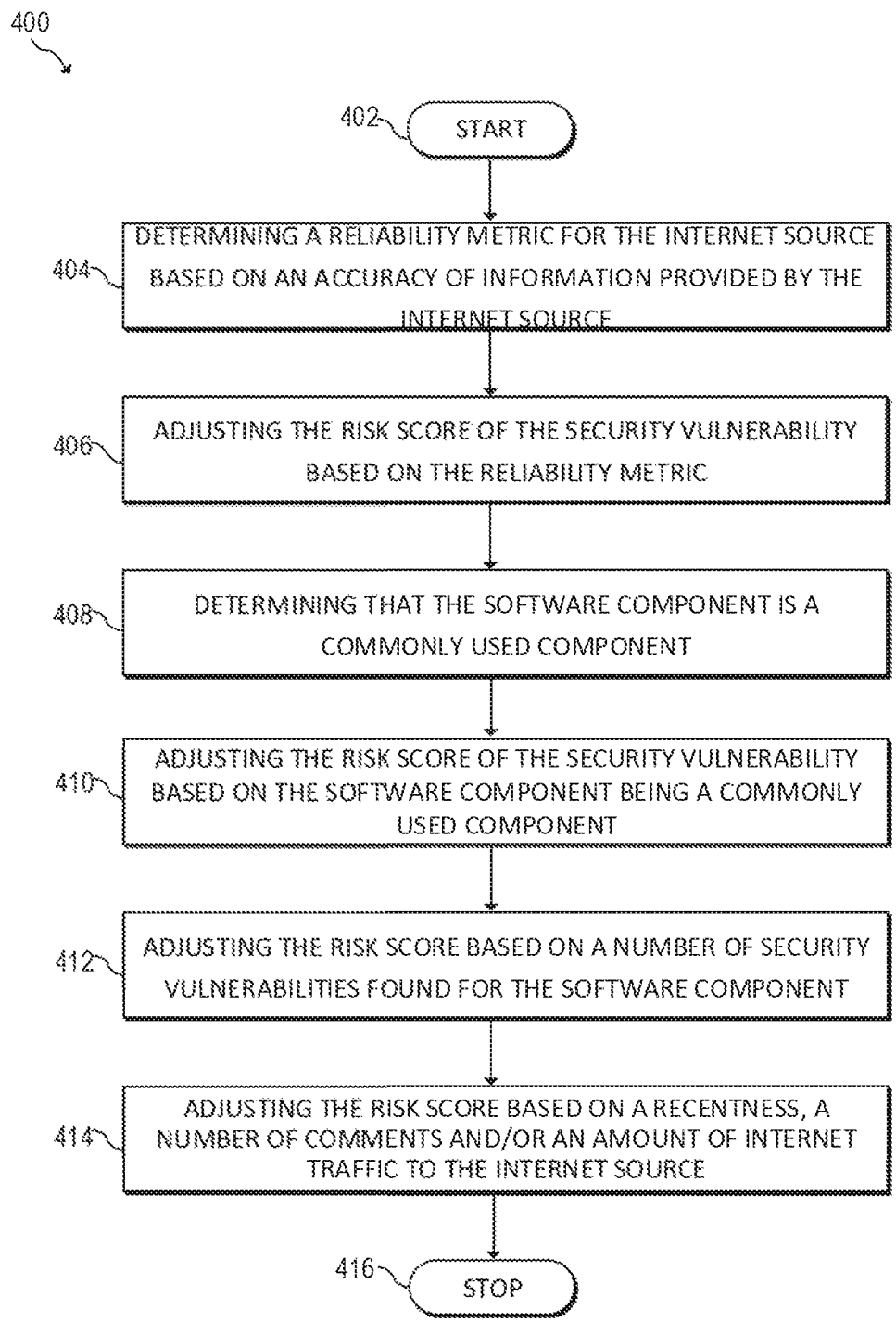
FIG. 4 is a flowchart of an example method for security vulnerability detection.

FIG. 4 is a flowchart of an example method 400 for a determining security vulnerabilities. Method 400 may be described below as being executed or performed by a system, for example, system 110 of FIG. 1, system 500 of FIG. 5 or system 600 of FIG. 6. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the method may include determining a reliability metric for the internet source based on an accuracy of information provided by the internet source. The reliability metric may be based on an accuracy of information provided by the internet source. At step 406, the method may include adjusting the risk score of the security vulnerability based on the reliability metric. At step 408, the method may include determining that the software component is a commonly used component. At step 410, the method may include adjusting the risk score of the security vulnerability based on the software component being a commonly used component. At step 412, the method may include adjusting the risk score based on a number of security vulnerabilities found for the software component. At step 414, the method may include adjusting the risk score based on a recentness of the internet source, a number of comments from the internet source and an amount of internet traffic to the internet source. Method 400 may eventually continue to step 416, where method 400 may stop.

Figure 5:
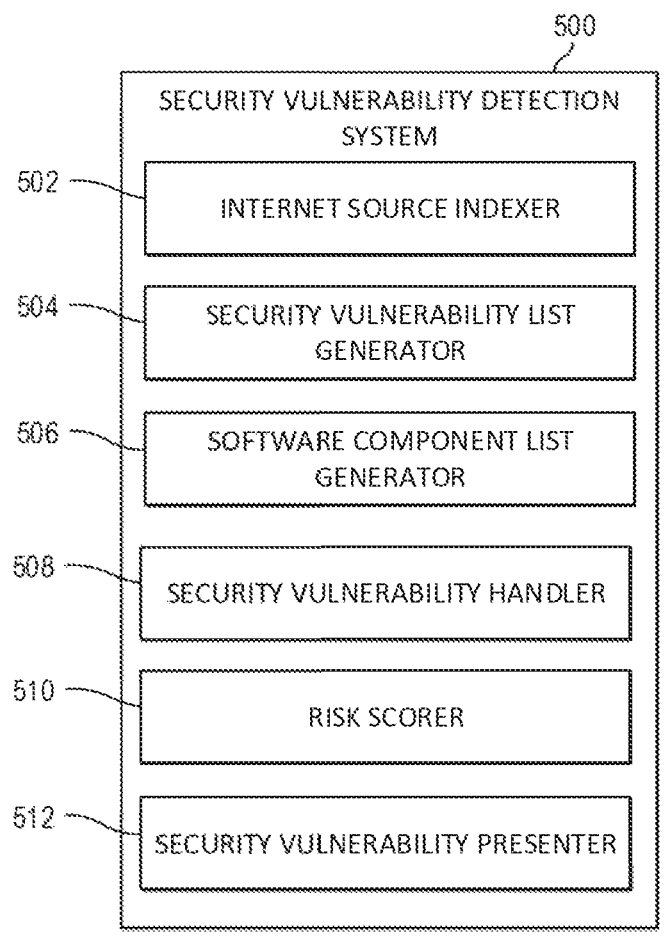
FIG. 5 is a block diagram of an example system for security vulnerability detection.

FIG. 5 is a block diagram of an example security vulnerability detection system 500. System 500 may be similar to system 110 of FIG. 1, for example, in the embodiment of FIG. 5, system 500 includes internet source indexer 502, security vulnerability list generator 504, software component list generator 506, security vulnerability handler 508, risk scorer 510 and security vulnerability presenter 512.

Internet source indexer 502 may index a variety of internet sources comprising third party submitted information, to extract security vulnerabilities based on the third party submitted information. Internet source indexer 502 may be implemented in the form of executable instructions stored on at least one machine-readable storage medium of system 500 and executed by at least one processor of system 500. Alternatively or in addition, internet source indexer 502 may be implemented in the form of one or more hardware devices including electronic circuitry for implementing the functionality of internet source indexer 502.

Security vulnerability list generator 504 may generate a security vulnerabilities list comprising security vulnerabilities from the internet source. Security vulnerability list generator 504 may be implemented in the form of executable instructions stored on at least one machine-readable storage medium of system 500 and executed by at least one processor of system 500. Alternatively or in addition, security vulnerability list generator 504 may be implemented in the form of one or more hardware devices including electronic circuitry for implementing the functionality of security vulnerability list generator 504.

Software component list generator 506 may generate a software components list comprising a software component used in an application and a version of the software component. The cache may include a hash table. Software component list generator 506 may be implemented in the form of executable instructions stored on at least one machine-readable storage medium of system 500 and executed by at least one processor of system 500. Alternatively or in addition, software component list generator 506 may be implemented in the form of one or more hardware devices including electronic circuitry for implementing the functionality of software component list generator 506.

Security vulnerability handler 508 may determine that a security vulnerability in the security vulnerabilities list affects the version of the software component from the software components list. Security vulnerability handler 508 may be implemented in the form of executable instructions stored on at least one machine-readable storage medium of system 500 and executed by at least one processor of system 500. Alternatively or in addition, security vulnerability handler 508 may be implemented in the form of one or more hardware devices including electronic circuitry for implementing the functionality of security vulnerability handler 508.

Risk scorer 510 may determine a risk score of the security vulnerability. Risk scorer 510 may be implemented in the form of executable instructions stored on at least one machine-readable storage medium of system 500 and executed by at least one processor of system 500. Alternatively or in addition, risk scorer 510 may be implemented in the form of one or more hardware devices including electronic circuitry for implementing the functionality of risk scorer 510.

Security vulnerability presenter 512 may present, via a user interface, the security vulnerability, the risk score, the software component and the version or the software component. Security vulnerability presenter 512 may be implemented in the form of executable instructions stored on at least one machine-readable storage medium of system 500 and executed by at least one processor of system 500. Alternatively or in addition, security vulnerability presenter 512 may be implemented in the form of one or more hardware devices including electronic circuitry for implementing the functionality of security vulnerability presenter 512.

Figure 6:
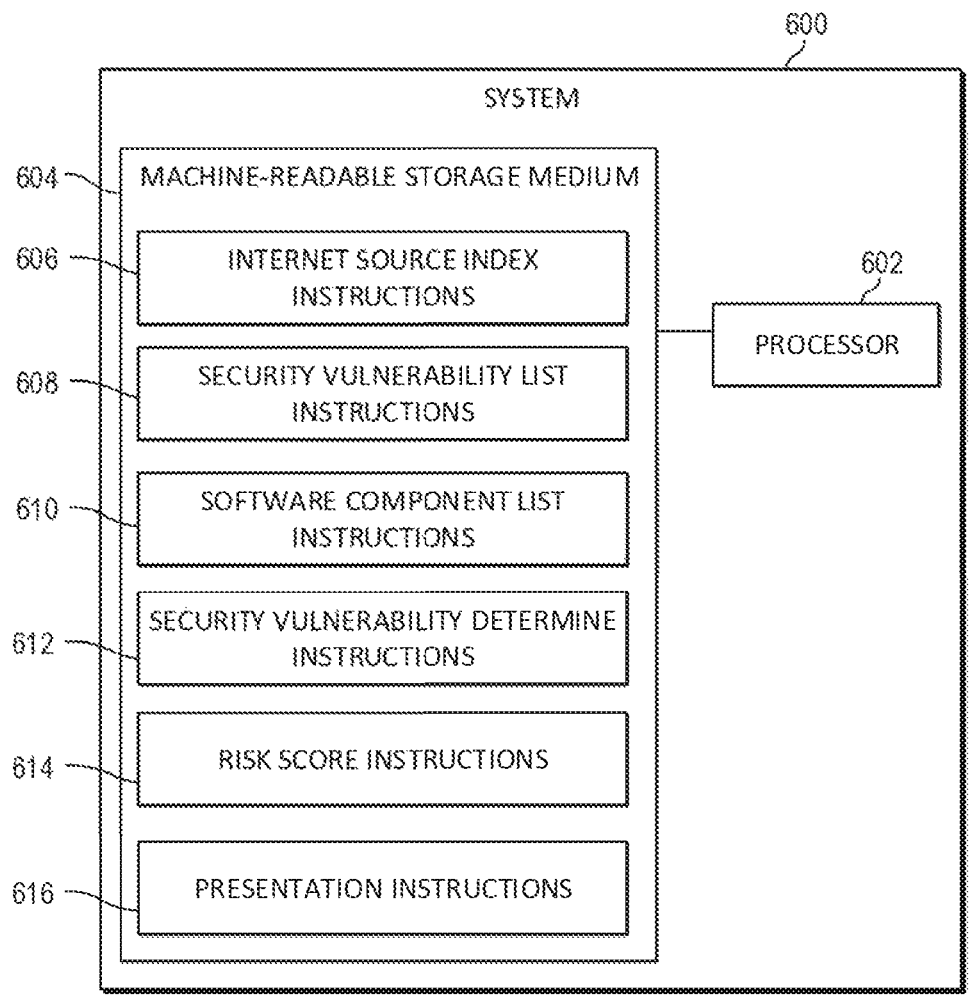
FIG. 6 is a block diagram of an example system for security vulnerability detection.

FIG. 6 is a block diagram of an example system 600 for security vulnerability detection. System 600 may be similar to system 110 of FIG. 1, for example. In the embodiment of FIG. 6, system 600 includes a processor 602 and a machine-readable storage medium 604. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 602 may be one or more central processing units (CPUs), microprocessors, and/or other hardware devices suitable for retrieval and execution of instructions stored in machine-readable storage medium 604. In the particular embodiment shown in FIG. 6, processor 802 may fetch, decode, and execute instructions 608, 608, 610, 612, 614 and 616 to perform security detection. As an alternative or in addition to retrieving and executing instructions, processor 602 may include one or more electronic circuits comprising a number of electronic components for performing the functionality of one or more of the instructions in machine-readable storage medium 604. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 604 may be any electronic, magnetic, optical, or other physical storage device that stores executable instructions. Thus, machine-readable storage medium 604 may be, for example, Random Access Memory (RAM), an Electrically-Erasable Programmable Read-Only Memory (EEPROM), a storage drive, an optical disc, and the like. Machine-readable storage medium 604 may be disposed within system 600, as shown in FIG. 6. In this situation, the executable instructions may be "installed" on the system 600. Alternatively, machine-readable storage medium 604 may be a portable, external or remote storage medium, for example, that allows system 600 to download the instructions from the portable/external/remote storage medium. In this situation, the executable instructions may be part of an "installation package". As described herein, machine-readable storage medium 604 may be encoded with executable instructions for a web technology responsive to mixtures of emotions.

Referring to FIG. 6, internet source index instructions 606, when executed by a processor (e.g., 602), may cause system 600 to index a variety of internet sources comprising third party submitted information, to extract security vulnerabilities based on the third party submitted information, wherein the third party is a party other than an original software vendor of a development platform. Security vulnerability lists instructions 608, when executed by a processor (e.g., 602), may generate a security vulnerabilities list comprising security vulnerabilities from the internet source. Software component list instructions 610, when executed by a processor (e.g., 602), may cause system 600 to generate a software components list comprising a software plug-in component used in the development platform and a version of the software component.

Security vulnerability determine instructions 612, when executed by a processor (e.g., 602), may cause system 600 to determine that a security vulnerability in the security vulnerabilities list affects the version of the software plug-in component from the software components list. Risk score instructions 614, when executed by a processor (e.g., 602), may cause system 600 to determine a risk score of the security vulnerability based on a number of security vulnerabilities found for the software plug-in component and whether a fix has been provided for each security vulnerability. Presentation instructions 616 may cause system 600 to present, via a user interface, the security vulnerability, the risk score, the software plug-in component and the version of the software plug-in component.

The foregoing disclosure describes a number of examples for security vulnerability detection. The disclosed examples may include systems, devices, computer-readable storage media, and methods for security vulnerability detection. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   indexing, by a system comprising a hardware processor, a plurality of internet sources comprising third party submitted information, to extract security vulnerabilities based on the third party submitted information;
   generating, by the system, a security vulnerabilities list comprising the security vulnerabilities extracted from the plurality of internet sources, the security vulnerabilities list further identifying software components affected by respective security vulnerabilities in the security vulnerabilities list;
   generating, by the system, a software components list comprising a software component used in an application;
   determining, by the system based on matching the software components identified in the security vulnerabilities list with the software component in the software components list, that a security vulnerability in the security vulnerabilities list affects the software component;
   determining, by the system, a risk score of the security vulnerability;
   generating information for presentation, via a user interface, of the security vulnerability, the risk score, and the software component; and
   adjusting, by the system, the risk score based on a number of security vulnerabilities found for the software component and whether a fix has been provided for each security vulnerability of the number of security vulnerabilities.

2. The method of claim 1, further comprising:
   determining a reliability metric for each respective internet source of the plurality of internet sources, wherein the reliability metric is based on an accuracy of information provided by the respective internet source,
   wherein the adjusting of the risk score of the security vulnerability is further based on the determined reliability metrics for the plurality of internet sources.

3. The method of claim 1, further comprising:
   determining an amount of use of the software component, wherein the adjusting of the risk score of the security vulnerability is further based on the determined amount of use of the software component.

4. The method of claim 1, wherein the generating of the software components list is based on scanning a resource of the application.

5. The method of claim 1, wherein the adjusting of the risk score is further based on one or more of a number of comments from an internet source of the plurality of internet sources, or an amount of internet traffic to an internet source of the plurality of internet sources.

6. The method of claim 1, wherein the indexing of the plurality of internet sources comprises indexing one or more of: a web site where individual users can submit information, a forum, a blog, a news site, or a social network.

7. The method of claim 1, wherein the indexing of the plurality of internet sources comprises indexing a community internet source comprising information that originates from a community member.

8. The method of claim 1, wherein the indexing of the plurality of internet sources comprises indexing an unstructured data source comprising third party submitted information regarding security vulnerabilities.

9. A system comprising:
   a processor; and
   a non-transitory storage medium storing instructions executable on the processor to:
      index a plurality of internet sources comprising third party submitted information, to extract security vulnerabilities based on the third party submitted information;
      generate a security vulnerabilities list comprising the security vulnerabilities extracted from the plurality of internet sources, the security vulnerabilities list further identifying software components affected by respective security vulnerabilities in the security vulnerabilities list;
      generate a software components list comprising a software component used in an application, and a version of the software component;
      determine, based on matching the software components identified in the security vulnerabilities list with the software component in the software components list, that a security vulnerability in the security vulnerabilities list affects the version of the software component from the software components list;
      determine a risk score of the security vulnerability;
      generate information for presentation, via a user interface, of the security vulnerability, the risk score, the software component, and the version of the software component;
      determine a reliability metric for each respective internet source of the plurality of internet sources, wherein the reliability metric is based on an accuracy of information provided by the respective internet source; and
      adjust the risk score of the security vulnerability based on the determined reliability metrics for the plurality of internet sources.

10. The system of claim 9, wherein the instructions are executable on the processor to index the plurality of internet sources that comprise an unstructured data source comprising third party submitted information regarding security vulnerabilities.

11. The system of claim 9, wherein the instructions are executable on the processor to adjust the risk score further based on a number of security vulnerabilities found for the software component, and whether a fix has been provided for each security vulnerability of the number of security vulnerabilities.

12. A non-transitory machine-readable storage medium comprising instructions that upon execution cause a system to:
   index a plurality of internet sources comprising third party submitted information, to extract security vulnerabilities based on the third party submitted information, wherein a third party is a party other than an original software vendor of a development platform;
generate a security vulnerabilities list comprising the security vulnerabilities extracted from the plurality of internet sources, the security vulnerabilities list further identifying software components affected by respective security vulnerabilities in the security vulnerabilities list;
generate a software components list comprising a software component used in the development platform, and a version of the software component;
determine, based on matching the software components identified in the security vulnerabilities list with the software component in the software components list, that a security vulnerability in the security vulnerabilities list affects the version of the software component from the software components list;
adjust a risk score of the security vulnerability based on a number of security vulnerabilities found for the software component and whether a fix has been provided for each security vulnerability of the number of security vulnerabilities; and
generate information for presentation, via a user interface, of the security vulnerability, the risk score, the software component, and the version of the software component.

13. The non-transitory machine-readable storage medium of claim 12, wherein the indexing of the plurality of internet sources comprises indexing an unstructured data source comprising third party submitted information regarding security vulnerabilities.

14. The non-transitory machine-readable storage medium of claim 12, wherein the instructions upon execution cause the system to:
adjust the risk score further based on one or more of a number of comments from an internet source of the plurality of internet sources, or an amount of internet traffic to an internet source of the plurality of internet sources.

15. The method of claim 1, further comprising:
detecting a change of the application; and
scanning the application to generate the software components list in response to detecting the change of the application.

16. The method of claim 15, further comprising:
updating the security vulnerabilities list in response to detecting the change of the application.

17. The system of claim 9, wherein the instructions are executable on the processor to:
detect a change of the application; and
scan the application to generate the software components list in response to detecting the change of the application.

18. The system of claim 17, wherein the instructions are executable on the processor to:
update the security vulnerabilities list in response to detecting the change of the application.

19. The non-transitory machine-readable storage medium of claim 12, wherein the instructions upon execution cause the system to:
detect a change of the development platform;
scan the development platform to generate the software components list in response to detecting the change of the development platform; and
update the security vulnerabilities list in response to detecting the change of the development platform.

* * * * *